(12) United States Patent
Shaffer

(10) Patent No.: US 8,494,685 B2
(45) Date of Patent: Jul. 23, 2013

(54) SYSTEM FOR UTILIZING PREDICTIVE ENERGY CONSUMPTION

(75) Inventor: Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 741 days.

(21) Appl. No.: 12/430,226

(22) Filed: Apr. 27, 2009

(65) Prior Publication Data

US 2010/0274402 A1 Oct. 28, 2010

(51) Int. Cl.
*G05D 11/00* (2006.01)

(52) U.S. Cl.
USPC .......................... 700/291; 715/771; 705/412

(58) Field of Classification Search
USPC ............ 700/276, 286, 291; 715/771; 705/412
See application file for complete search history.

(56) References Cited

U.S. PATENT DOCUMENTS

| | | | |
|---|---|---|---|
| 6,512,966 B2 * | 1/2003 | Lof et al. ...................... | 700/291 |
| 6,681,154 B2 * | 1/2004 | Nierlich et al. ................ | 700/286 |
| 6,732,019 B2 * | 5/2004 | Spool et al. ................... | 700/291 |
| 6,745,109 B2 * | 6/2004 | Kojima et al. ................ | 700/291 |
| 6,785,592 B1 * | 8/2004 | Smith et al. ................... | 700/291 |
| 7,062,360 B2 * | 6/2006 | Fairlie et al. .................. | 700/286 |
| 7,181,316 B2 * | 2/2007 | Fairlie et al. .................. | 700/266 |
| 7,343,226 B2 * | 3/2008 | Ehlers et al. .................. | 700/276 |
| 7,406,364 B2 * | 7/2008 | Andren et al. ................ | 700/286 |
| 7,478,070 B2 * | 1/2009 | Fukui et al. ................... | 705/412 |
| 7,519,453 B2 * | 4/2009 | Fairlie et al. .................. | 700/266 |
| 7,647,137 B2 * | 1/2010 | Schindler ...................... | 700/291 |
| 7,783,390 B2 * | 8/2010 | Miller ........................... | 700/291 |
| 2001/0025209 A1 * | 9/2001 | Fukui et al. ................... | 700/291 |
| 2002/0087234 A1 * | 7/2002 | Lof et al. ...................... | 700/286 |
| 2002/0198629 A1 * | 12/2002 | Ellis .............................. | 700/286 |
| 2003/0055677 A1 * | 3/2003 | Brown et al. ..................... | 705/1 |
| 2004/0133314 A1 * | 7/2004 | Ehlers et al. .................. | 700/276 |
| 2004/0158360 A1 * | 8/2004 | Garland et al. ............... | 700/286 |
| 2004/0220702 A1 * | 11/2004 | Matsubara et al. ............ | 700/291 |
| 2004/0231339 A1 * | 11/2004 | Miozza et al. ................... | 62/3.2 |
| 2005/0055137 A1 * | 3/2005 | Andren et al. ................ | 700/291 |
| 2005/0234600 A1 * | 10/2005 | Boucher et al. ............... | 700/286 |
| 2006/0184287 A1 * | 8/2006 | Belady et al. ................. | 700/291 |
| 2007/0244604 A1 * | 10/2007 | McNally ....................... | 700/291 |
| 2007/0276547 A1 * | 11/2007 | Miller ........................... | 700/295 |
| 2008/0167756 A1 * | 7/2008 | Golden et al. ................ | 700/297 |
| 2008/0228325 A1 * | 9/2008 | Schindler ...................... | 700/291 |
| 2009/0012654 A1 * | 1/2009 | Culp et al. .................... | 700/291 |
| 2009/0048716 A1 * | 2/2009 | Marhoefer ..................... | 700/291 |
| 2009/0083167 A1 * | 3/2009 | Subbloie ......................... | 705/34 |
| 2009/0240381 A1 * | 9/2009 | Lane .............................. | 700/296 |
| 2010/0114799 A1 * | 5/2010 | Black et al. ................... | 705/412 |
| 2010/0268579 A1 * | 10/2010 | Momoh ....................... | 705/14.1 |
| 2010/0275147 A1 * | 10/2010 | Kaufman et al. ............. | 715/771 |

* cited by examiner

*Primary Examiner* — Mohammad Ali
*Assistant Examiner* — Anthony Whittington
(74) *Attorney, Agent, or Firm* — P. Su

(57) ABSTRACT

In one embodiment, a method includes identifying a first time that is associated with a first demand amount for a resource. The method also includes providing the resource to a device such that the device changes an area temperature from a first temperature to approximately a second temperature that is reached at approximately the first time. The resource is withheld from the device when the second temperature is approximately reached at approximately the first time.

17 Claims, 8 Drawing Sheets

SYSTEM FOR UTILIZING PREDICTIVE ENERGY CONSUMPTION

BACKGROUND OF THE INVENTION

The present invention relates generally to energy consumption.

The demand for energy resources often varies during the course of a day. By way of example, the demand for energy is often lower during the night and higher during the day. At times, the demand for energy may peak such that an energy supplier must resort to peak consumption shaving techniques that may inconvenience customers. When the demand for energy peaks, the energy supplier may request that customers or end-users turn off appliances, or the energy supplier may limit the amount of energy that the customers may use when demand for energy is high.

If customers are unable to use energy when they demand it, customers are often dissatisfied. For example, on a particularly hot day, customers may wish to utilize their air conditioners in order to maintain a comfortable temperature in their environments. If the demand for energy is peaked such that many customers are unable to use their air conditioners, those customers are likely to be extremely dissatisfied. Although the temperature in their environments may remain within a desired range for some time after customers are unable to use their air conditioners, the temperature will often exceed the desired range at some point. The closer the temperature is to the upper threshold of the desired range when the customer is unable to use energy, the more likely the temperature is to eventually exceed the upper threshold.

BRIEF DESCRIPTION OF THE DRAWINGS

The invention will be readily understood by the following detailed description in conjunction with the accompanying drawings in which.

DESCRIPTION OF EXAMPLE EMBODIMENTS

General Overview

Figure 1:
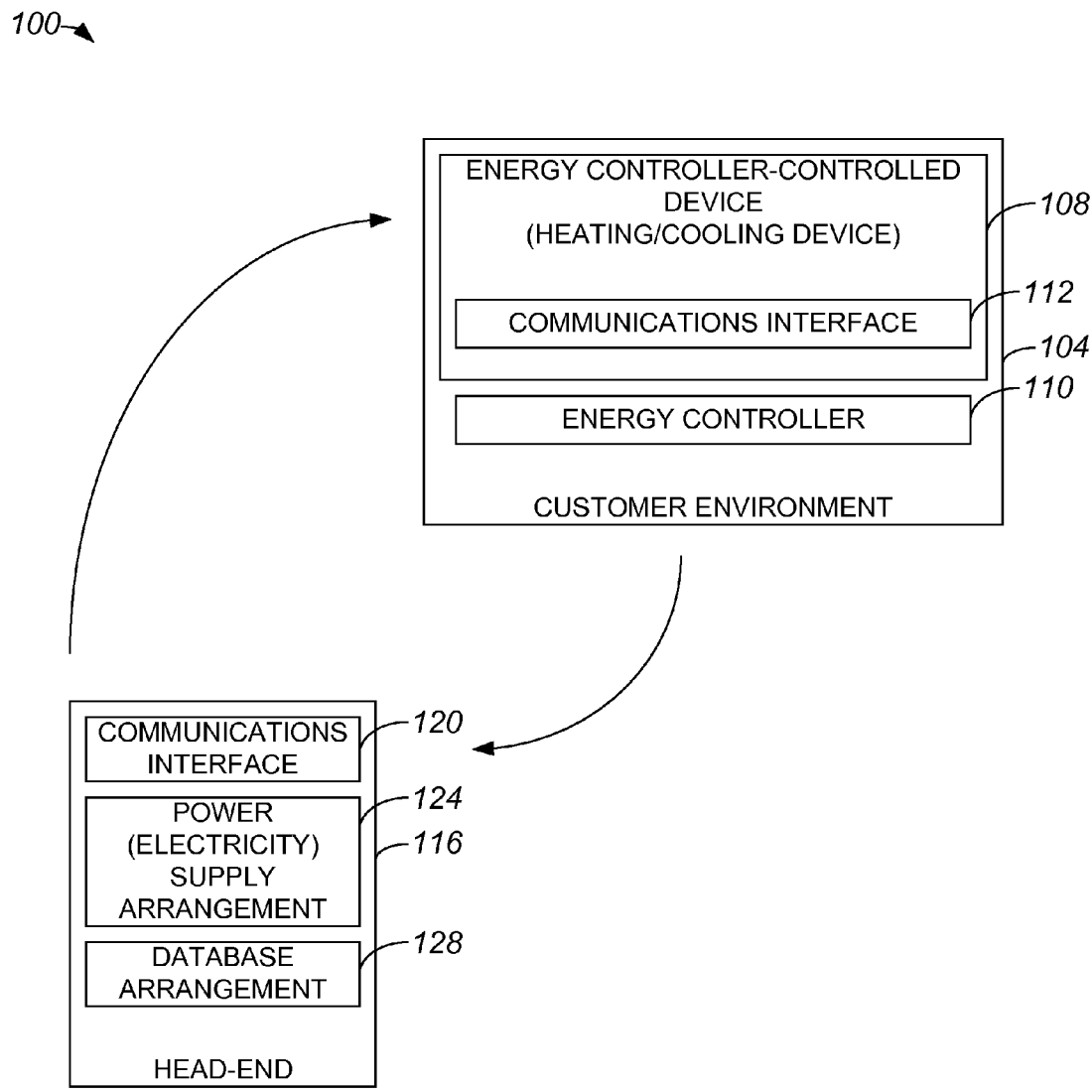
FIG. 1 is a block diagram representation of a climate control system that utilizes predictive energy consumption in accordance with an embodiment of the present invention.

According to one aspect of the present invention, a method includes identifying a first time that is associated with a first demand amount for a resource. The method also includes providing the resource to a device such that the device changes an area temperature from a first temperature to approximately a second temperature that is reached at approximately the first time. The resource is withheld from the device when the second temperature is approximately reached at approximately the first time. In one embodiment, the first demand amount is a predicted peak demand amount, and the resource is an energy-related resource.

Description

When there is a peak in demand for resources, and a utility company does not have sufficient resources to meet the demand, some customers may be prevented from using the resources. The customers that lose the use of resources provided by the utility may experience a drop in satisfaction. For example, a home which loses all electrical power when the utility company has insufficient capacity to supply the home may result in the occupants of the home being inconvenienced and likely dissatisfied. A customer who is asked by a utility company to turn off certain appliances in order to implement peak consumption shaving may also be dissatisfied. Although a utility company may in some situations use peak load shaving to "shave off" or reduce some of the demand by obtaining extra resources from other sources, e.g., a combustion power generation plant that is substantially only run by some customers when there is a high demand for power, activating or otherwise obtaining such extra resources may often be expensive for the utility company.

To reduce or substantially avoid the need for peak load shaving, a climate-control system may effectively be informed by a demand response system of a utility when there will be a peak in demand for resources and invoke the early use of the resources when the resources are readily available. By way of example, an air conditioning appliance or a heating appliance may use resources such as energy when there is readily available energy prior to a peak in demand, and substantially avoid using energy during a peak in the demand for energy. In other words, the air conditioning appliance or the heating appliance may consume energy when it is readily available, and likely less expensive, rather than when demand for the energy may be greater. Predicting when a peak in the demand for energy may occur allows a system to invoke the early use of energy.

In general, an area, e.g., a room, is heated and/or cooled by an energy controller-controlled (EC-controlled) device such that a temperature in the area is maintained within a particular desired range. Just prior to a predicted or otherwise anticipated peak in demand for energy, the room may be heated to approximately the highest temperature in the range, or the room may be cooled to approximately the lowest temperature in the range, as appropriate. As a result, the EC-controlled device would effectively end any significant consumption of energy just as the peak in demand for energy begins, thereby potentially alleviating the demand for energy during a peak demand period. Further, when the temperature in the area is at an appropriate threshold temperature when a peak in demand for energy begins, the amount of time the temperature in the area may be maintained in the desired range generally increases. For example, if the temperature in the area is cooled by an air conditioning appliance to approximately the lowest temperature in a desired range just prior to a peak in demand, although the temperature may rise after the air conditioning appliance is turned off, the temperature may be maintained within the desired range for longer than if the temperature was higher than the lowest temperature in the desired range just prior to the peak in demand. Similarly, if the temperature in the area is heated or warmed by a heating appliance to approximately the highest temperature in a desired range just prior to a peak in demand, while the temperature may decrease after the heating appliance is turned off, the temperature may be maintained within the desired range for longer than if the temperature was lower than the highest temperature in the desired range just prior to the peak in demand.

Referring initially to FIG. 1, a climate control system that utilizes predictive energy consumption will be described in accordance with an embodiment of the present invention. A climate control system 100 includes a customer environment or site 104 and a head-end 116. Customer environment 104 may be a building, e.g., a home or an office building, or substantially any designated area, e.g., a room in a building. Head-end 116 may be associated with a utility company, or substantially any provider of a resource that is used by customer environment 104.

Customer environment 104 includes an EC-controlled device 108 which, in the described embodiment, is an appliance which is arranged to heat and/or cool customer environment 104. EC-controlled device 108 is typically programmed to operate such that when a temperature of customer environment 104 is not within a desired range, EC-controlled device 108 turns on to either raise or lower the temperature as appropriate. An energy controller 110 is configured to control operations of EC-controlled device 108, and may utilize temperature-related information, e.g., information obtained from a thermostat, to control operations of EC-controlled device 108.

EC-controlled device 108 may establish communication with head-end 116 such that head-end 116 may effectively convey information that has an affect on the operation of EC-controlled device 108. For example, if head-end 128 predicts that peak in demand for power is to occur at a future time, then head-end 128 may affect the operations of EC-controlled device 108 to utilize power while customer environment 104 is effectively still within comfort thresholds, such that the EC-controlled device 108 may substantially avoid using power at the future time.

Head-end 116 includes a power or electricity supply arrangement 124 that is configured for head-end 116 to supply power or electricity to customer environment 104. Power supply arrangement 124 may be associated with a power grid which provides power to customer environment 104 or, in one embodiment, EC-controlled device 108. Power supply arrangement 124 may be configured to help balance power generation and transmission with load presented by consumers. In one embodiment, when power supply is predicted as possibly falling short of demand, energy controller 110 may be notified, e.g., by power supply arrangement 124, of an estimated time at which an imbalance may occur. Head-end 116 also includes a database arrangement 128 which is arranged to obtain information that may be used to forecast demands, and to determine an amount of readily available power. Database arrangement 128 may either store information, as for example in a database (not shown), or may access information from an external source (not shown).

In general, head-end 116 and customer environment 104 may exchange information or otherwise communicate through a communications interface 120 and a communications interface 112, respectively. Any suitable communications network (not shown) may generally enable information to be sent and received using communications interface 120 and communications interface 112. Energy controller 110 uses information regarding the temperature of customer environment 104 and communicates with head-end 116 using communications interface 112. Head-end 116 may effectively control energy controller 110 by sending commands or other information using communications interface 120. It should be appreciated that energy controller 110 may control EC-controlled device 108 using information received from head-end 116.

In one embodiment, commands provided by head-end 116 may effectively override or interrupt a program executing on EC-controlled device 108 and cause EC-controlled device 108 to turn on when the program specifies otherwise, e.g., that the EC-controlled device is to be turned off. Alternatively, head-end 116 may provide new information to energy controller 110, and a program or application may use the new information to start the operation of EC-controlled device 108 during a time when a room temperature is within comfort limits. Information and/or commands provided by head-end 116 may also be used to essentially restore the program executing on EC-controlled device 108 after an "interrupt" of the program is completed. It should be appreciated that an "interrupt" is just an example of accounting for time-varying information obtained from head-end 116.

Figure 2:
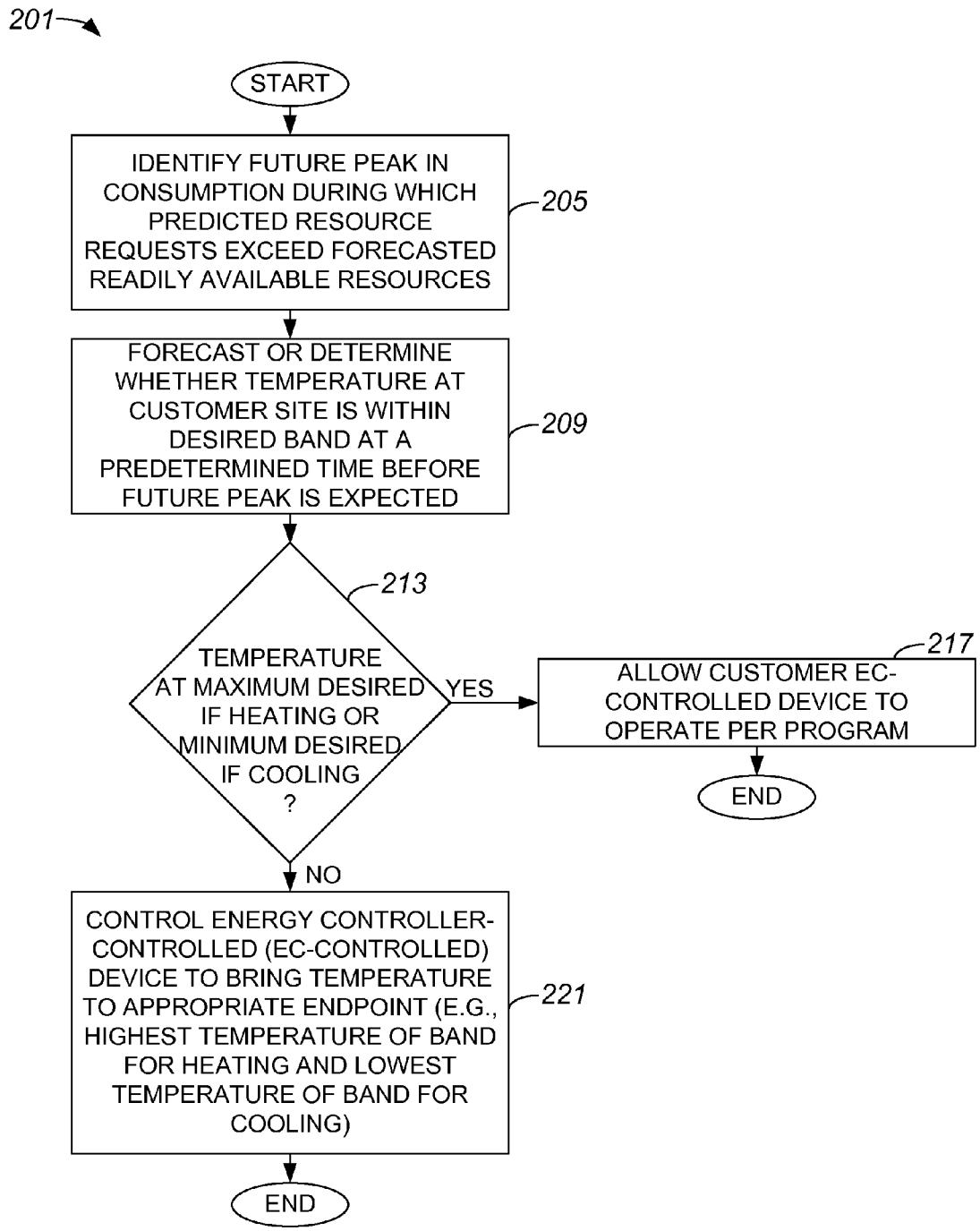
FIG. 2 is a process flow diagram which illustrates a general method of regulating climate control at a customer site based on predictive energy consumption in accordance with an embodiment of the present invention.

A head-end, e.g., a resource control center, that is in communication with an EC-controlled device via a network may provide signals to turn on, and to turn off, the EC-controlled device. In other words, a head-end that communicates with an EC-controlled device may effectively override a program on the device such that even if the program indicates that the device is to be off, the head-end may cause the device to turn on. It should be appreciated that in some embodiments, the head-end substantially only provides information to an energy controller, and the energy controller which acts upon the information obtained from the head-end to change operations of device to substantially optimize heating and/or cooling cycles, as appropriate, with regard to peak load conditions. FIG. 2 is a process flow diagram which illustrates a general method of regulating climate control at a customer site, e.g., such that the temperature of the environment at the customer site is effectively regulated, based on predictive energy consumption in accordance with an embodiment of the present invention. A process 201 of remotely regulating climate control begins at step 205 in which a future peak in load, e.g., energy consumption that substantially coincides with forecasted available resources being exceeded, is identified. That is, a future peak in consumption that occurs when or substantially while readily available resources are forecasted as being exceeded is identified. The identification may be made by an energy controller or a head-end, depending upon how an overall system is configured. As will be appreciated by those skilled in the art, utilities generally maintain certain spinning reserve margins, e.g., operational reserve margins, to mitigate brownouts. As such, in one embodiment, an estimated time when a load may exceed readily available resources refers to readily available resources minus legally required spinning reserves.

It should be appreciated that factors used to determine whether forecasted, or expected, readily available resources will be exceeded may vary. By way of example, the forecasted readily available resources may be indicative of the substantially maximum amount of resources that may be produced. Alternatively, the forecasted readily available resource may be indicative of the substantially maximum amount of resources that are readily available. The amount of resources that are readily available and the amount of resources that may be produced may differ. The term "readily available" may refer to low cost resources such as those produced by conventional generators powered by coal and/or nuclear energy, as compared with more expensive resources, e.g., resources generated using combustion generators powered by gas.

Once a future peak in consumption, or a future shortage of resources, is identified in step 205, the temperature at the customer site is forecasted or otherwise determined relative to a predetermined time before the future peak is expected in step 209. In other words, the temperature at the customer site is estimated for a predetermined time before the future peak, and it is forecasted or otherwise determined whether that temperature is within a desired band. As will be appreciated by those skilled in the art, an EC-controlled device is generally arranged to maintain a temperature within a particular band or range. For example, an climate control unit in a private home may be arranged to maintain a temperature of between approximately a first temperature and a second temperature such that if the temperature is lower than the first temperature, the climate control unit heats the home, and such that if the temperature is higher than the second temperature, the climate control unit cools the home.

The predetermined time before a future peak is expected may substantially correspond to an amount of time estimated as being needed to lower the temperature at the customer site to the lowest desired temperature or to raise the temperature at the customer site to the highest desired temperate, as appropriate. In one embodiment, the predetermined time may be a set amount of time before the future peak is expected.

A determination is made in step 213 as to whether the temperature at the customer site is at approximately a maximum desired temperature if the desired band is associated with a heating cycle, or if the temperature at the customer site is at approximately a minimum desired temperature if the desired band is associated with a cooling cycle. If the determination is that the temperature is at approximately a maximum desired temperature if the desired band is associated with a heating cycle, or if the determination is that the temperature is at approximately a minimum desired temperature if the desired band is associated with a cooling cycle, then the indication is that the early use of resources is not to be invoked. As such, an EC-controlled device at the customer site is allowed to operate in step 217 as programmed. In other words, settings provided by an administrator at the customer site are effectively not overridden, e.g., by an energy controller using information provided by a head-end. The process of regulating climate control is completed after the EC-controlled device is allowed to operate as programmed. It should be appreciated that previous steps may be periodically revisited at substantially any time in an effort to ensure that a substantially optimal cycle may be achieved.

Alternatively, if it is determined in step 213 that the temperature is not at a maximum desired temperature for a heating cycle or at a minimum desired temperature for a cooling cycle, the implication is that the early use of resources may be invoked to bring the temperature to either approximately the maximum desired temperature for a heating cycle or approximately the minimum desired temperature for a cooling cycle, as appropriate. In other words, the temperature is brought to the approximately maximum desired temperature at substantially the same time the peak load event occurs for a heating cycle for a heater, and the temperature is brought to the approximately minimum desired temperature at substantially the same time the peak load event occurs for a cooling cycle for an air conditioner. Accordingly, a head-end and/or an energy controller may control the EC-controlled device at the customer site in step 221 to bring the temperature to an appropriate endpoint, threshold, or boundary at approximately the same time that a peak load occurs. It should be appreciated that the appropriate endpoint may be approximately the highest temperature in a desired band for heating or the lowest temperature in a desired band for cooling. The desired band may represent a "comfort zone" specified by the customer site. The head-end may send signals, as for example via communications channels in a network, to the EC-controlled device to control the operation of the EC-controlled device. Once the head-end controls the EC-controlled device, the process of remotely regulating climate control is completed.

In general, when the early use of resources is invoked to cool an environment, as for example when an air conditioner is to be turned on to reduce the temperature at a customer site, the temperature may be reduced such that at a time when a peak in usage is expected to occur, an approximately minimum desired temperature is reached. If a minimum desired temperature is essentially reached at a time when a peak consumption period starts, e.g., a peak in usage throughout an overall system, that is anticipated, then the temperature at the customer site may remain in a desired band of temperatures for a substantially maximum amount of time after resources a peak load condition starts. A peak load condition may occur for any number of reasons including, but no limited to including, the presence of an unplanned load on an energy grid or an unexpected loss of a generation facility.

Figure 3:
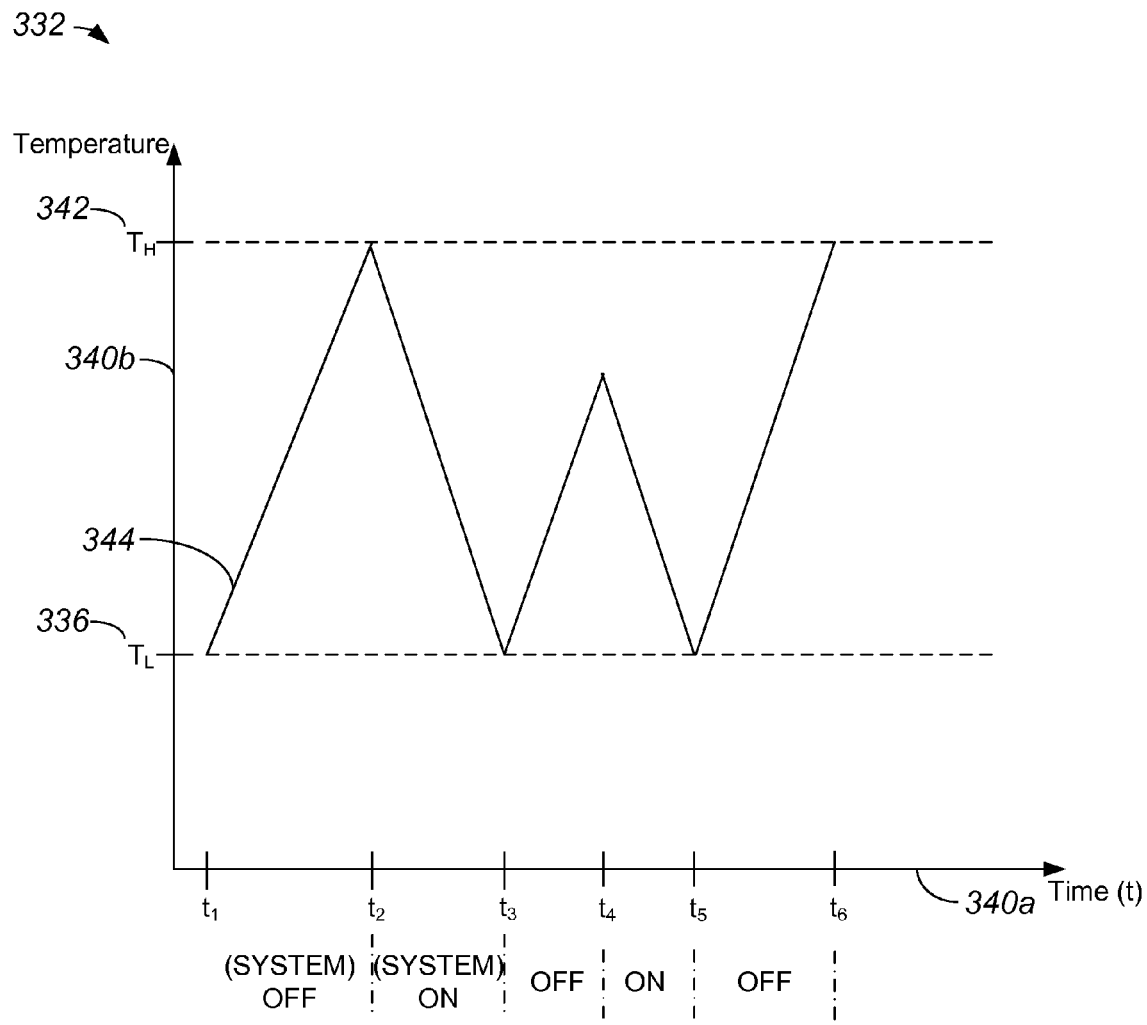
FIG. 3 is a diagrammatic representation of a temperature profile associated with a cooling system controlled using predictive energy consumption in accordance with an embodiment of the present invention.

FIG. 3 is a diagrammatic representation of a temperature profile associated with a cooling system controlled using predictive energy consumption in accordance with an embodiment of the present invention. A graphical representation 332 includes a time axis 340a and a temperature axis 340b. In an environment in which a temperature is cooled using a cooling system, a desired temperature band or range is defined between a high temperature ($T_H$) 342, or a higher bound threshold temperature, and a low temperature ($T_L$) 336, or a lower bound threshold temperature. Typically, in a cooling system, $T_H$ 342 is substantially the maximum temperature that is acceptable in an environment. Hence, if $T_H$ 342 is approximately reached, a cooling system turns on to cool the environment. When a cooling system turns on, energy is effectively used by the cooling system to lower the temperature of the environment. The cooling system may remain on until $T_L$ 336 is approximately reached, at which point the cooling system may turn off. Turning off the cooling system generally includes substantially withdrawing the energy from the cooling system, denying the cooling system more energy, withholding energy from the cooling system, or ceasing providing the cooling system with more energy.

A trace or profile 344 represents the temperature of an environment. At a time t1, trace 344 indicates that the temperature of the environment is approximately $T_L$ 336. The cooling system is off between time t1 and a time t2 while the temperature of the environment rises, e.g., due to the cooling system being off. At time t2, as shown by trace 344, the temperature of the environment is approximately $T_H$ 342, or approximately the maximum desired temperature in the environment. Between time t2 and a time t3, the cooling system is on such that cooling is provided to the environment. As such, trace 344 indicates that the temperature of the environment is lowered from approximately $T_H$ 342 to approximately $T_L$ 336 such that $T_L$ 336 is substantially reached at time t3. At time t3, the cooling system turns off and, as indicated by trace 344, the temperature of the environment begins to rise. The length of time needed for the temperature to rise is generally different from the duration of a cooling down period, although the length and the duration may be approximately the same.

For illustrative purposes, energy demand is predicted as peaking at approximately time t5. Such a prediction may be made based on, for example, an expectation of warmer-than-expected temperatures that may cause consumers to invoke cooling earlier than predicted. Therefore, at a time t4, which is a predetermined amount of time before time t5 as calculated based on a cooling down rate that may be achieved and a specific temperature at which the environment may be at any given time, an early use of energy is effectively invoked. Although trace 344 indicates that the temperature at time t4 is within the desired band between $T_H$ 342 and $T_L$ 336, the cooling unit is turned on at time t4 in order to avoid having to consume energy at time t5, when there are effectively no readily available energy resources that are accessible to a given grid section. It should be appreciated that when there are effectively no readily available energy resources, a utility may need to purchase energy at a premium cost, bring expensive generators online, and/or invoke demand response. In one embodiment, time t4 is calculated such that $T_L$ 336 may be reached substantially at time t5. In other words, time t4 is chosen to enable the temperature of the environment to follow a substantially standard cooling trend to cool and reach a lower bound temperature of a desired band at time t5. It should be appreciated that in some instances, the temperature of the environment may be brought down to a temperature lower than $T_L$ 336 at time t4.

At time t5, the cooling unit is turned off. As time t5 corresponds to a time at which energy demand is predicted as peaking, or otherwise exceeding a readily available energy generation or transmission capacity, trace 344 indicates that the temperature of the environment is allowed to rise. At a time t6, if energy demand is no longer at its peak and/or if there is readily available energy for the cooling unit, the cooling unit may turn on to cool the environment. If there is substantially no readily available energy at time t6, however, it should be understood that the temperature of the environment may continue to increase, as there is substantially no energy readily available to turn on the cooling unit. In one embodiment, time t5 may instead be a time when the time of use rate a utility charges to its customers increases, and time t4 may be calculated such that energy may be used before the time of use rate increases.

Figure 4:
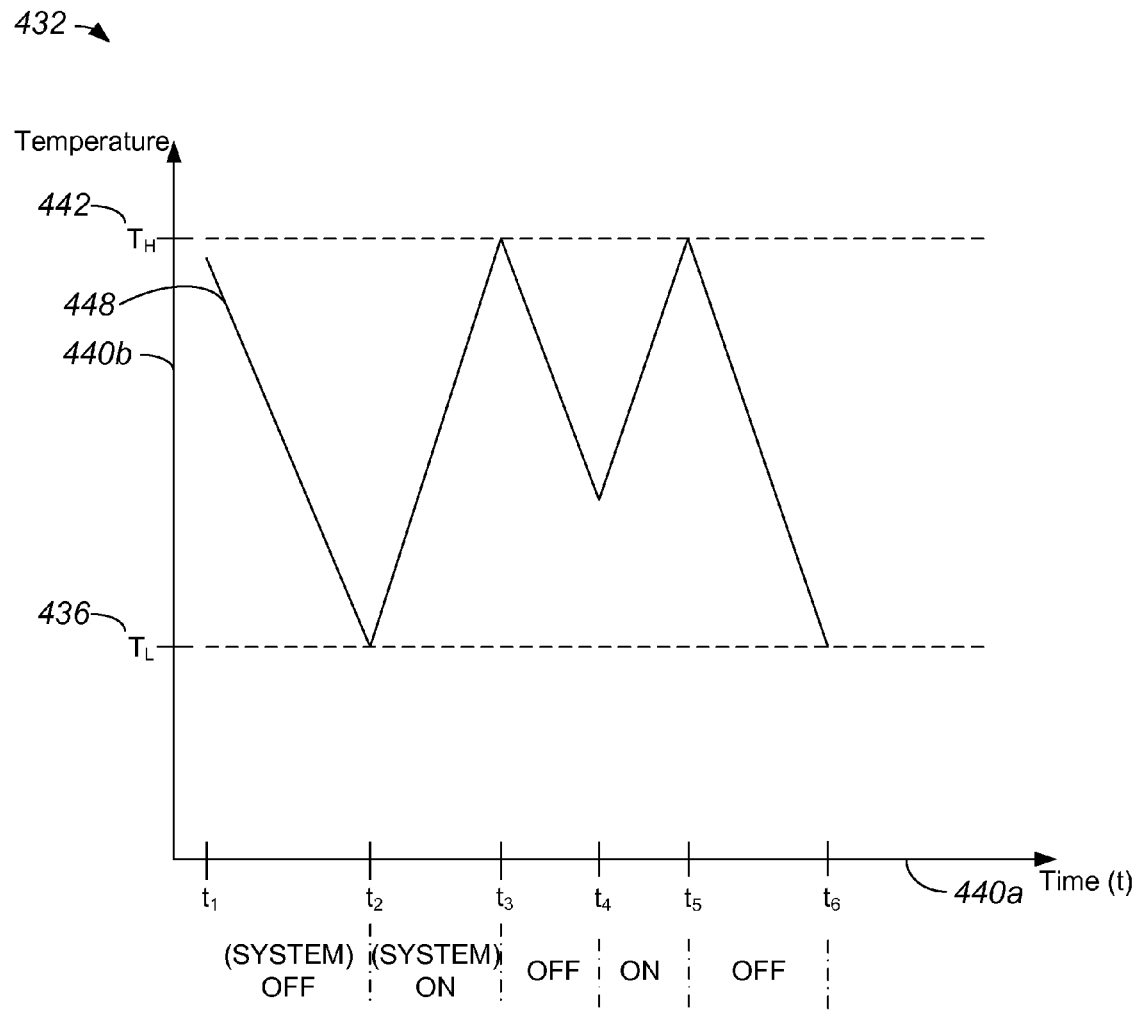
FIG. 4 is a diagrammatic representation of a temperature profile associated with a heating system controlled using predictive energy consumption in accordance with an embodiment of the present invention.

With reference to FIG. 4, a temperature profile associated with a heating system that may be controlled using predictive energy consumption will be described in accordance with an embodiment of the present invention. A graphical representation 432 of a temperature trace or profile 448 associated with a heating system includes a time axis 440a and a temperature axis 440b. In an environment in which a temperature is raised using a heating system, a desired temperature band or range is defined between $T_H$ 442, or a higher bound or endpoint temperature, and $T_L$ 436, or a lower bound or endpoint temperature. Generally, in a heating system, $T_H$ 442 is substantially the maximum temperature that is desired in an environment, while when $T_L$ 436 is approximately reached, the heating system turns on to heat the environment. When the heating system turns on, energy is effectively used to raise the temperature in the environment. The heating system may remain on until the higher or upper bound temperature $T_H$ 442 is approximately reached. When $T_H$ 442 is approximately reached, the heating system may turn off. Turning off the heating system may entail substantially withdrawing the energy from the heating system, denying the heating system further energy, withholding the energy from the heating system, or ceasing providing the heating system with any more energy.

Trace 448 represents the temperature of an environment. At a time t1, trace 448 indicates that the temperature of the environment is approximately $T_H$ 442. The heating system is off between time t1 and a time t2 while the temperature of the environment cools, e.g., due to the heating system being off. At time t2, as indicated by trace 448, the temperature of the environment is approximately $T_L$ 436, or approximately the minimum desired or acceptable temperature in the environment. At approximately time t2, the heating system utilizes energy and turns on. In one embodiment, an energy controller may provide energy to a heating system, thereby allowing the heating system to start a heating process.

Between time t2 and a time t3, the heating system heats the environment. In other words, the heating system is on such that heat is provided to the environment substantially between time t2 and time t3. Trace 448 indicates that the temperature of the environment is raised to approximately $T_H$ 442 from approximately $T_L$ 436 such that $T_H$ 442 is substantially reached at time t3. At time t3, the heating system turns off and the temperature of the environment begins to decrease. A heating system may cease operation either because the heating system is turned off programmatically, or because an energy controller turns of the power to the heating system.

In the described embodiment, energy demand is predicted as peaking at approximately time t5. For example, a power supply arrangement may predict that due to cooler than expected temperatures, consumers may turn their heating systems on earlier than previously predicted and, thus, risk the ability of a utility to maintain adequate spinning reserves. Therefore, at a time t4, which is a predetermined amount of time before time t5, an early use of energy is effectively invoked. Although trace 344 indicates that the temperature at time t4 is within the desired band between $T_H$ 442 and $T_L$ 436, the heating unit is turned on at time t4 in order to avoid having to consume energy at time t5, when there are effectively no readily available energy resources that are accessible. Time t4 may be calculated such that $T_H$ 442 is substantially reached approximately at time t5, i.e., approximately when energy demand is predicted as peaking.

At time t5, the heating unit is turned off and, as indicated by trace 448, the temperature of the environment is allowed to decline. At a time t6, if energy demand is no longer at its peak and/or if there is readily available energy to be satisfy a demand of the heating unit, the heating unit may be turned on. If there is substantially no readily available energy at time t6, however, the temperature of the environment may continue to decrease, and may subsequently fall below $T_L$ 436 because there is effectively no readily available energy in a grid section associated with the heating system.

Statistical information collected by a head-end, which may be associated with an energy or power supplier, may be used to forecast a potential demand for energy. In general, an energy or power supplier is a utility company. As will be appreciated by those skilled in the art, information relating to past energy usage of customer sites may be used by an energy supplier to forecast or predict how much energy is likely to be used under certain conditions. By way of example, an amount of energy used by customers of an energy supplier on a previous day in which temperatures exceeded 100 degrees Fahrenheit (F) may be used by the energy supplier to estimate how much energy is relatively likely to be demanded or otherwise requested at future times when temperatures are predicted to exceed 100 degrees. The energy supplier may compare a demand forecast with a forecast of readily available resources to determine when it may be appropriate to invoke the early consumption of energy.

Figure 5:
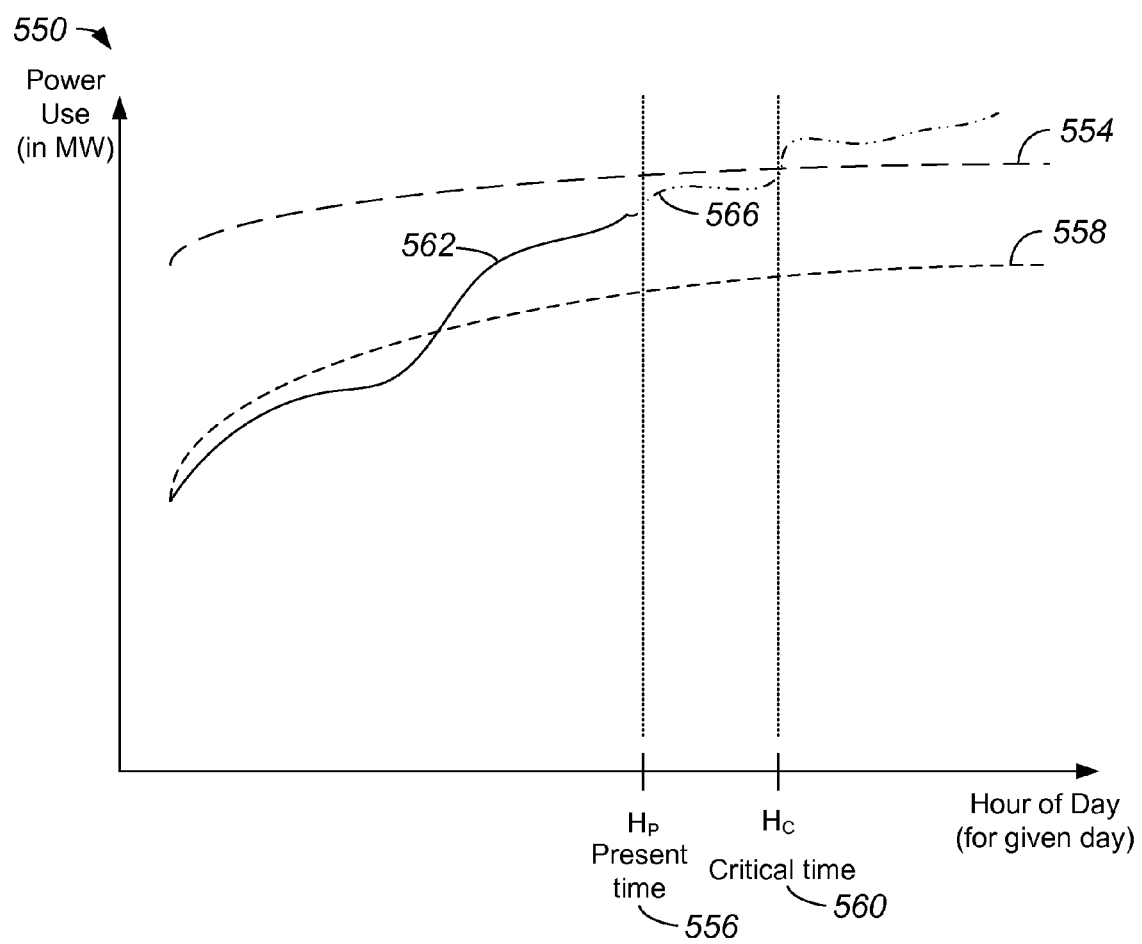
FIG. 5 is a diagrammatic representation of energy consumption graph in accordance with an embodiment of the present invention.

FIG. 5 is a diagrammatic representation of energy consumption graph in accordance with an embodiment of the present invention. An energy consumption graph 550 is typically created and maintained by, or for, an energy or power supplier. Energy consumption graph 550 includes a representation 562 of an actual power usage at different hours during a current day, a representation 558 of a previously anticipated demand forecast at different hours during the current day, a representation 566 of a revised demand forecast, and a representation 554 of a forecast for readily available resources during the current day.

Representation 562 of actual power usage is arranged to substantially show how much power was used by customers before present hour $H_P$ 556. Representation 562 may be generated by gathering information from an electricity grid, e.g., through a communications network, which indicates how much power is consumed by customers.

In one embodiment, representation 558 of a previously anticipated demand forecast may be a forecast generated on a previous day. For example, representation 558 may be a prediction generated the day before the current day. Representation 558 may be generated based on how much power was actually demanded on a previous day which was relatively similar to the current day. Whether a current day is considered to be similar to a previous day may depend on a variety of factors including, but not limited to including, the season, the day of the week, and/or the weather.

Representation 554 of a forecast for readily available resources may be indicative of either an amount of resources reserved by or allocated to the energy supplier, or an amount of resources that the energy supplier may acquire if necessary. Typically, representation 554 is arranged to indicate the amount of resources, e.g., power or transmission capacity, that is substantially readily available to the energy supplier at any hour of the current day. For purposes of illustration, energy consumption graph 550 effectively assumes that there are no spinning reserves, although many system will typically include spinning reserves.

At present time $H_P$ 556, the actual demand for energy up to present hour $H_P$ 556 is known, as indicated by representation 562. Hence, using information effectively provided in representation 562, as well as other information, e.g., information relating to the weather, a demand forecast may be revised. That is, a demand forecast that is based on information that is more recent than the information used to substantially generate representation 558 may be created as indicated by representation 566.

Using representation 566 of a revised demand forecast, a utility may identify a critical time $H_C$ 560, or a time at which a demand forecast is predicted as being relatively likely to exceed the forecasted amount of readily available resources. As shown, at approximately critical time $H_C$ 560, representation 566 of a revised demand forecast begins to exceed a forecast for readily available resources as indicated by representation 554. Hence, at some time between present time $H_P$ 556 and critical time $H_C$ 560, the energy supplier may invoke the early use of energy in an attempt to bring demand and supply into balance. The invocation of the early use of energy may help to postpone when a critical time $H_C$ 560 occurs and, hence, allow for additional time to bring new resources online. Invoking the early use of energy may include commanding devices, as for example heating units, at customer sites to utilize energy, as for example to heat customer environments to substantially maximum desired temperatures. If early use of energy is invoked with respect to at least some customer sites serviced by the utility, the likelihood that the utility will need more resources than are available at critical time $H_C$ 560 may be reduced. The early use of energy prior to critical time $H_C$ 560 may result in a reduction in demand for resources at critical time $H_C$ 560. As previously mentioned, the invocation of the early use of energy may help to postpone when a critical time $H_C$ 560 occurs and, hence, allow for additional time to bring new resources online.

Figure 6:
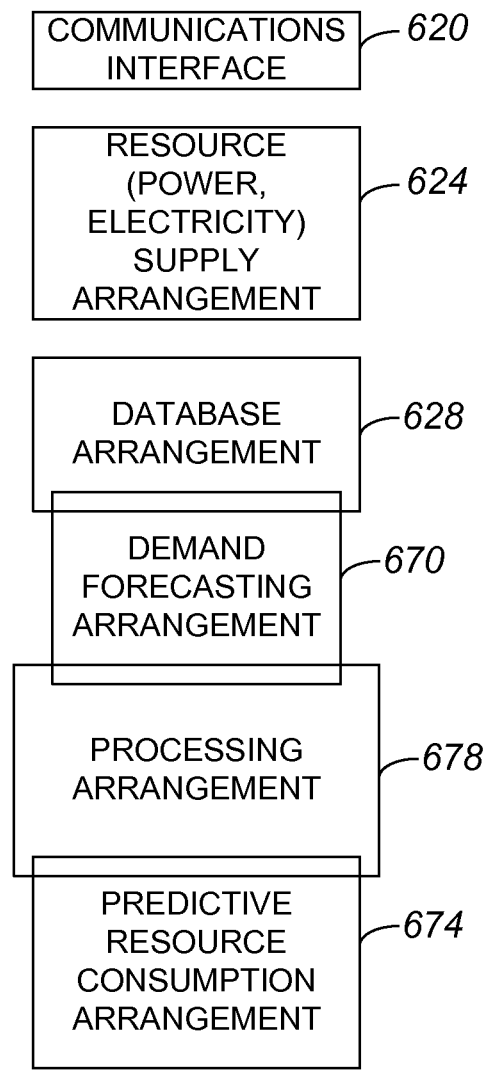
FIG. 6 is a block diagram representation of a head-end in accordance with an embodiment of the present invention.

A utility or, more generally, a resource supplier, may include a head-end that includes functionality used to implement predictive resource consumption, e.g., by invoking the early use of the resource. FIG. 6 is a block diagram representation of a head-end in accordance with an embodiment of the present invention. A head-end 616 generally includes a communications interface 620 that is arranged to allow head-end 616 to send signals to, and/or receive signals from, an energy controller (not shown) or, in some instances, a device (not shown) at a customer site. In one embodiment, communications interface 620 includes at least one port that is arranged to be used to send and to receive information from an energy controller (not shown) or, in some instances, an EC-controlled device (not shown) at a customer site.

Head-end 616 also includes a resource supply arrangement 624 that configured monitor the availability of resources to be provided to a device (not shown) at a customer site. Resource supply arrangement 624 may be arranged to monitor a device (not shown) at a customer site with regards to any suitable resource, as for example power or electricity.

Information that is used by head-end 616 to forecast demand for a resource may be accessed using database arrangement 628. Database arrangement 628 may include a database in which information obtained through communications interface 620 may be stored such that the information is accessible to head-end 616. Alternatively, database arrangement 628 may be arranged to obtain information from external databases (not shown). If database arrangement 628 includes a database or other storage structure, then information stored in the database may include, but is not limited to including, historical demand information associated with customer sites, weather forecast information, and/or historical weather information. Database arrangement 628 may also store information relating to the preferences associated with various customer sites. By way of example, database arrangement 628 may store information that indicates whether various customer sites are amenable to invoking early resource usage.

A demand forecasting arrangement 670 is arranged to use information obtained from database arrangement 628 to predict various demands. Demand forecasting arrangement 670 may be used to identify a likely demand for a resource, and a likely availability of the resource.

A predictive resource consumption arrangement 674 may be configured to determine whether there is a time at which demand for a resource is likely to exceed a readily available amount of the resource, and to determine when to invoke the early usage of the resource with respect to various customer sites. An energy controller at a customer site may typically control a device at the customer site, However, it should be appreciated that predictive resource consumption arrangement 674 may also be used to control devices (not shown) at the customer sites by turning the devices on to invoke the early use of resources. That is, predictive resource consumption arrangement 674 may use communications interface 620 to interact with energy controllers (not shown) at customer sites to implement early use of resources.

A processing arrangement 678 cooperates with demand forecasting arrangement 670 and predictive resource consumption arrangement 674 to forecast demands for resources and to identify appropriate times to invoke the early use of resources. In one embodiment, processing arrangement 678 is arranged to execute computer code or logic associated with demand forecasting arrangement 670 and predictive resource consumption arrangement 674.

Figure 7:
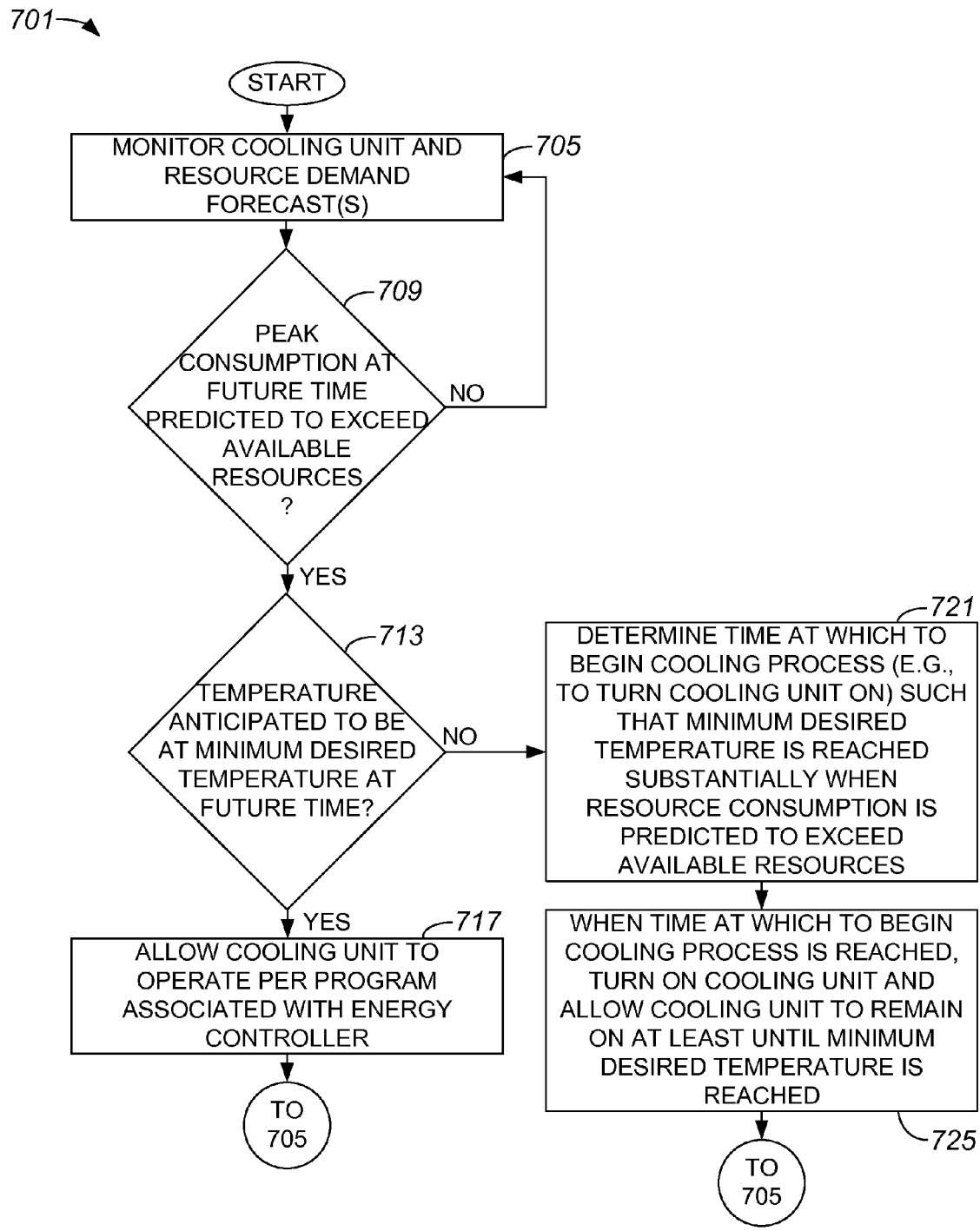
FIG. 7 is a process flow diagram which illustrates a method of controlling a cooling unit at a customer site based on predictive energy consumption in accordance with an embodiment of the present invention.

Referring next to FIG. 7, controlling a cooling unit or device at a customer site based on predictive energy consumption will be described in accordance with an embodiment of the present invention. A process 701 of controlling a cooling unit begins at step 705 in which a cooling unit and resource demand forecasts are monitored, as for example by an energy controller. That is, the operation of the cooling unit is effectively tracked, and the resource demand forecasts associated with the head-end are generally known.

In step 709, it is determined whether there is a peak amount of consumption that is forecasted at a future time, and is predicted to exceed the amount of resources readily available to the head-end. It should be appreciated that in identifying a peak consumption at a future time, the future time may be limited to being within a certain range of time. By way of example, it may be identified if there is a peak consumption in the future within a certain number of hours from the current time. If it is determined that there is no future time at which a peak consumption is predicted to exceed available resources, then the indication is that the cooling unit at the customer site may operate as programmed. As such, process flow returns to step 705 in which the cooling unit and resource demand forecasts are monitored.

Alternatively, if the determination in step 709 is that there is a predicted peak consumption that is expected to exceed the amount of available resources, then the indication is that the early use of resources may be invoked. As such, a determination is made in step 713 as to whether the temperature in the environment of the cooling unit is anticipated to be at a minimum desired temperature at a future time, e.g., a critical time such as $H_C$, as described above. If the determination is that the temperature in the environment is anticipated to be at a minimum desired temperature at a future time, then the indication is that the early use of resources is not to be invoked. As such, in step 717, the cooling unit is allowed to operate substantially as programmed. After the cooling unit is allowed to operate substantially as programmed, process flow returns to step 705 in which the cooling unit and resource demand forecasts are monitored.

Returning to step 713, if it is determined that the temperature in the environment is anticipated not to be at approximately a minimum desired temperature at a future time, then the implication is that the temperature of the environment is to be reduced to approximately a minimum desired temperature, e.g., a lower threshold or endpoint in a desired temperature range. Accordingly, in step 721, an appropriate time at which to begin a cooling process is determined. The appropriate time at which to turn the cooling unit on such that a cooling process may begin may be determined such that the minimum desired temperature is approximately reached when resource demand peaks, or when resource consumption is predicted to exceed readily available resources.

Once the time at which to begin a cooling process is determined, an energy controller effectively identifies when that time has arrived. When the time at which to begin a cooling process is reached, the cooling unit may be turned on, e.g., such that cooled air is provided to the environment, in step 725. The cooling unit is turned on and remains on at least until the minimum desired temperature, and/or the critical time, is approximately reached. It should be appreciated that a temperature of less than the minimum desired temperature may be reached. After the cooling unit is turned on and allowed to remain on at least until the minimum desired temperature and/or the critical is reached, process flow returns to step 705 in which the cooling unit and resource demand forecasts are monitored.

Figure 8:
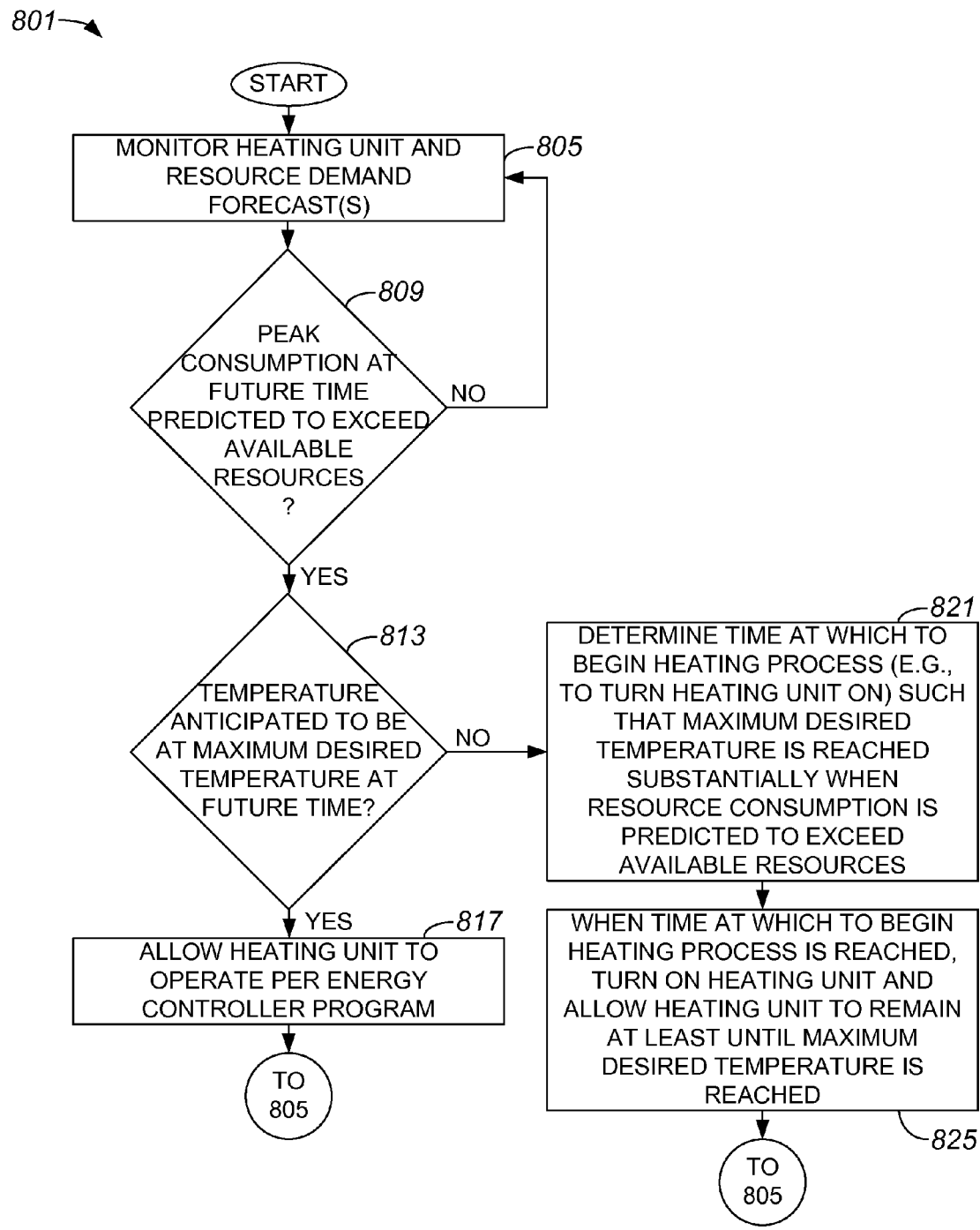
FIG. 8 is a process flow diagram which illustrates a method of controlling a heating unit at a customer site based on predictive energy consumption in accordance with an embodiment of the present invention.

With reference to FIG. 8, a method of controlling a heating unit at a customer site based on predictive energy consumption will be described in accordance with an embodiment of the present invention. A process 801 of controlling a heating unit begins at step 805 in which the heating unit and resource demand forecasts are monitored, as for example by an energy controller. A determination is made in step 809 as to whether a peak amount of consumption is predicted in the near future, and demand is predicted to exceed the amount of resources readily available to the an electric grid section associated with the heating system at the future time. If it is determined that there is no future time, e.g., that there is no time within a particular time period, at which demand for resources is predicted to exceed readily available resources, process flow returns to step 805 in which the heating unit and resource demand forecasts are monitored.

Alternatively, if the determination in step 809 is that a predicted peak consumption, or a predicted peak demand, is expected to exceed the amount of readily available resources, then the indication is that the early use of resources may be invoked. As such, a determination is made in step 813 regarding whether the temperature in the environment associated with the heating unit is anticipated to be at a maximum desired temperature at a future time. It should be appreciated that the maximum desired temperature is typically the upper threshold in a desired temperature range. If the determination is that the temperature in the environment is anticipated to be at a maximum desired temperature at a future time, then the indication is that the early use of resources is not to be invoked. If the early use of resources is not to be invoked, the heating unit is allowed to operate substantially as expected, e.g., substantially as an energy controller is programmed to cause the heating unit to operate, in step 817. After the heating unit is allowed to operate substantially as expected, process flow returns to step 805 in which the heating unit and resource demand forecasts are monitored.

Returning to step 813, if it is determined that the temperature in the environment is not anticipated to be at approximately a maximum desired temperature at a future time at which a peak consumption is predicted to exceed available resources, then the implication is that the temperature of the environment is to be raised to approximately a maximum desired temperature. Accordingly, in step 821, an appropriate time at which to begin a heating process is identified. The appropriate time may be determined such that the maximum desired temperature is approximately reached when resource demand peaks, or when resource consumption is predicted to exceed readily available resources.

When a time at which to begin a heating process is identified, an energy controller effectively identifies when that time has arrived. The heating unit may be turned on, e.g., such that heated air is provided to the environment, in step 825 once the time at which to begin the heating process is reached. The heating unit is turned on and remains on at least until the maximum desired temperature and/or a critical time is approximately reached. The heating unit may, in one embodiment, remain on until the maximum desired temperature is exceeded. After the heating unit is turned on and allowed to remain on at least until the maximum desired temperature and/or a critical time is reached, process flow returns to step 805 in which the heating unit and resource demand forecasts are monitored.

Although only a few embodiments of the present invention have been described, it should be understood that the present invention may be embodied in many other specific forms without departing from the spirit or the scope of the present invention. By way of example, an EC-controlled device generally draws some amount of power, and an energy controller draws some amount of power to obtain information regarding the temperature of an environment from a thermostat. Turning on a device generally involves providing an increased amount of power or energy to the device such that the device may cool air or heat air as appropriate. Similarly, turning off a device generally involves substantially decreasing the amount of power or energy provided to the device such that the device no longer cools or heats air. In other words, when an EC-controlled device is on, the EC-controlled device effectively generates cooled or heated air. On the other hand, when an EC-controlled device is off, the EC-controlled device effectively does not effectively generate cooled or heated air.

While energy is described as being a resource which may be consumed based on predictions of future demand and/or supply, it should be appreciated that the present invention is not limited to resources associated with energy Further, the types of energy which may be consumed based on predictions of future demand and/or supply may vary widely. The types of energy or power may be associated with, but are not limited to being associated with, solar sources, electricity, gas, oil, coal, nuclear sources, hydraulic sources, and the like. In one embodiment, electricity is the resource that may be consumed based on predictions of future demand and/or supply. It should be appreciated that resources are not limited to being associated with power generation capacity, but may also be associated with capacities of power transmissions grids.

A customer, e.g., an owner of a programmable EC-controlled device that is suitable for being controlled by an energy controller, may elect not to allow the energy controller to effectively override the operation of the device. That is, a customer may prevent the energy controller from invoking the early use of resources in anticipation of peak consumption being reached without departing from the spirit or the scope of the present invention. In one embodiment, a customer site may effectively notify the head-end that the device at the customer site will not participate in any early use of resources. It should be appreciated, however, that the head-end may instead notify the customer site each time that a peak load condition is forecasted, and allow the customer site to independently decide each time whether to support invoking the early use of resources.

Predictive energy consumption has generally been described as being used in conjunction with EC-controlled devices. Such devices may include, but are not limited to including, air conditioners, heaters, refrigerators, freezers, and substantially any other device or appliance that is responsible for altering or maintaining a temperature range. It should be appreciated, however, that predictive energy consumption is not limited to being used in conjunction with EC-controlled devices. For instance, predictive energy consumption may be used in conjunction with a data back-up system. A data back-up system which is arranged to back-up data at a scheduled time may be used to back-up data at an earlier time and potentially aver the need to run a back-up process at the scheduled time.

As mentioned above, EC-controlled devices are arranged to operate to maintain a temperature range or band in an area. In one embodiment, EC-controlled devices may be arranged to support more than one temperature range. By way of example, during normal operations or operations when there is no invocation of early energy use, EC-controlled devices may be programmed to maintain a temperature between a first temperature T1 and a second temperature T2. EC-controlled devices may further be programmed such that when an energy supplier determines that an energy shortage is likely to occur in the relatively near future, a broader temperature range may be defined. The broader temperature range may allow for the temperature in the area to be cooled to less than T1 or to be heated to more than T2, as appropriate. Utilizing a broader temperature range allows the EC-controlled devices to effectively prepare their designated areas to sustain longer periods substantially without utilizing energy, and essentially without compromising the comfort level of customers.

Predictive consumption may be applied to efficiently use a resource such as energy at substantially any time. In one embodiment, if an EC-controlled device present in an environment is programmed such that the EC-controlled device is turned off at a future time, e.g., to conserve energy when nobody is in the environment, the temperature in an environment serviced by the EC-controlled device may be allowed to reach one threshold in a desired temperature range. For instance, if an EC-controlled device is arranged to cool an environment and to maintain a temperature in the range of between approximately 65 degrees Fahrenheit and approximately 78 degrees Fahrenheit, if it is known that the EC-controlled device will effectively be turned off at a given time, the EC-controlled device may be controlled such that the temperature is approximately 78 degrees Fahrenheit at that given time. In other words, EC-controlled device may operate to reduce the temperature as appropriate in an environment while maintaining the temperature within a desired range, but may operate such that the environment is at approximately the highest desired temperature at the time the EC-controlled device is turned off. Generally, if nobody is going to be in an environment, it may be desirable not to maintain the temperature of the environment in a desired temperature range, as maintaining the temperature in the desired temperature range utilizes energy and there would be nobody in the environment to benefit from such a usage of energy.

In one embodiment, a peak consumption and a peak demand may be substantially the same. It should be appreciated, however, that a peak consumption and a peak demand may vary, as a substantially maximum amount of resources consumed may be lower than a substantially maximum amount of resources demanded or otherwise requested.

Although the early use of resources has been described as being associated with identifying a future peak in resource demand or consumption, the early use of resources is not limited to being invoked in response to substantially reducing the need for peak consumption shaving in the future. By way of example, a system may be set such that if a resource demand is predicted as exceeding a particular level at a future time, an EC-controlled device may be turned on such that an approximately maximum temperature or an approximately minimum temperature, as appropriate, is reached at that future time. The particular level may be a level that does not effectively correspond to a peak demand or consumption, but may be a level that a system prefers not to exceed if possible.

In lieu of using a head-end to substantially control an EC-controlled device, other embodiments of the present invention may substantially control an EC-controlled device using a distributed mode or a combination of a head-end and a distributed mode. By way of example, in a distributed mode, a head-end may substantially only provide information to an energy controller, and the energy controller may use that information to control an EC-controlled device. Another mode may effectively involve a hybrid of using a head-end to substantially control an EC-controlled device and using substantially only an energy controller to substantially control the EC-controlled device without departing from the spirit or the scope of the present invention.

The embodiments of the present invention may be implemented as hardware and/or software logic embodied in a tangible medium that, when executed, is operable to perform the various methods and processes described above. That is, the logic may be embodied as physical arrangements or components. For example, an arrangement that determines when to turn on a thermostat-controlled unit such that a desired target temperature may be reached, and the unit may turned off, when an actual demand for energy resources exceeds an available amount of resources may include hardware logic, software logic, or a combination of both hardware and software logic. The tangible medium may be substantially any computer-readable medium that is capable of storing logic which may be executed, e.g., by a computing system, to perform methods and functions associated with the embodiments of the present invention.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
identifying a first time, the first time being associated with a first demand amount for a resource;
providing the resource to a device such that the device changes an area temperature from a first temperature to approximately a second temperature, wherein the second temperature is approximately reached at approximately the first time, and wherein the device is an EC-controlled device, the EC-controlled device being arranged to maintain the area temperature within an associated temperature band, the associated temperature band having an endpoint, the first temperature being within the associated temperature band; and
withholding the resource to the device when the second temperature is approximately reached at approximately the first time, wherein the endpoint is associated with a maximum temperature of the associated temperature band and the second temperature is greater than the maximum temperature, and wherein providing the resource to the device allows the device to heat the area temperature to approximately the second temperature.

2. The method of claim 1 wherein the first demand for the resource is a demand for the resource that approximately exceeds a first available amount of the resource, and wherein the resource is energy.

3. The method of claim 1 wherein the first demand for the resource is a demand for the resource that approximately exceeds a first available amount of the resource, and wherein the resource is a transmission capacity.

4. A method comprising:
identifying a first time, the first time being associated with a first demand amount for a resource;
providing the resource to a device such that the device changes an area temperature from a first temperature to approximately a second temperature, wherein the second temperature is approximately reached at approximately the first time, and wherein the device is an EC-controlled device, the EC-controlled device being arranged to maintain the area temperature within an associated temperature band, the associated temperature band having an endpoint, the first temperature being within the associated temperature band; and
withholding the resource to the device when the second temperature is approximately reached at approximately the first time, wherein the endpoint is associated with a minimum temperature of the associated temperature band and the second temperature is lower than the minimum temperature, and wherein providing the resource to the device allows the device to cool the area temperature to approximately the second temperature.

5. Logic encoded in one or more non-transitory tangible media for execution and when executed operable to:
identify a first time, the first time being associated with a first demand amount for a resource;
provide the resource to a device such that the device changes an area temperature from a first temperature to approximately a second temperature, wherein the second temperature is approximately reached at approximately the first time, and wherein the device is an EC-controlled device, the EC-controlled device being arranged to maintain the area temperature within an associated temperature band, the associated temperature band having an endpoint, the first temperature being within the associated temperature band; and
withhold the resource to the device when the second temperature is approximately reached at approximately the first time, wherein the endpoint is associated with a maximum temperature of the associated temperature band and the second temperature is greater than the maximum temperature, and wherein the logic operable to provide the resource to the device allows the device to heat the area temperature to approximately the second temperature.

6. The logic of claim 5 wherein the first demand for the resource is a demand for the resource that approximately exceeds a first available amount of the resource, and wherein the resource is energy.

7. The logic of claim 5 wherein the first demand for the resource is a demand for the resource that approximately exceeds a first available amount of the resource, and wherein the resource is a transmission capacity.

8. Logic encoded in one or more non-transitory tangible media for execution and when executed operable to:
identify a first time, the first time being associated with a first demand amount for a resource:
provide the resource to a device such that the device changes an area temperature from a first temperature to approximately a second temperature, wherein the second temperature is approximately reached at approximately the first time, and wherein the device is an EC-controlled device, the EC-controlled device being arranged to maintain the area temperature within an associated temperature band, the associated temperature band having an endpoint, the first temperature being within the associated temperature band; and
withhold the resource to the device when the second temperature is approximately reached at approximately the first time, wherein the endpoint is associated with a minimum temperature of the associated temperature band and the second temperature is lower than the minimum temperature, and wherein the logic operable to provide the resource to the device allows the device to cool the area temperature to approximately the second temperature.

9. An apparatus comprising:

a resource supply arrangement, the resource supply arrangement being configured to provide a resource to a device;

a demand forecasting arrangement, the demand forecasting arrangement being configured to forecast a first time at which a demand for the resource is anticipated to reach a first level; and a predictive resource consumption arrangement, the predictive resource consumption arrangement being arranged to determine a second time at which to begin to provide the resource to the device, the second time being before the first time, wherein the predictive resource consumption arrangement is further arranged to cause the resource supply arrangement to provide the resource to the device beginning at approximately the second time and ending at approximately the first time.

10. The apparatus of claim 9 wherein the first level corresponds to a level at which the demand for the resource approximately exceeds an availability of the resource.

11. The apparatus of claim 9 wherein the resource is an energy resource.

12. The apparatus of claim 9 further including:
a communications interface, the communications interface being arranged to enable communications with the device.

13. The apparatus of claim 9 wherein the predictive resource consumption arrangement is arranged to communicate with the device to command the device to alter a temperature associated with the device.

14. The method of claim 4 wherein the first demand for the resource is a demand for the resource that approximately exceeds a first available amount of the resource, and wherein the resource is energy.

15. The method of claim 4 wherein the first demand for the resource is a demand for the resource that approximately exceeds a first available amount of the resource, and wherein the resource is a transmission capacity.

16. The logic of claim 8 wherein the first demand for the resource is a demand for the resource that approximately exceeds a first available amount of the resource, and wherein the resource is energy.

17. The logic of claim 8 wherein the first demand for the resource is a demand for the resource that approximately exceeds a first available amount of the resource, and wherein the resource is a transmission capacity.

* * * * *